(12) United States Patent
Prenn et al.

(10) Patent No.: US 11,609,189 B2
(45) Date of Patent: Mar. 21, 2023

(54) CT SCANNER AND METHOD FOR PERFORMING A CT EXAMINATION OF AN OBJECT

(71) Applicant: BIOMETIC S.R.L., Bressanone (IT)

(72) Inventors: Thomas Prenn, Campo Tures (IT); Enrico Ursella, Mestre (IT)

(73) Assignee: BIOMETIC S.R.L., Bressanone (IT)

( * ) Notice: Subject to any disclaimer, the term of this patent is extended or adjusted under 35 U.S.C. 154(b) by 51 days.

(21) Appl. No.: 17/338,186

(22) Filed: Jun. 3, 2021

(65) Prior Publication Data
US 2021/0389260 A1     Dec. 16, 2021

(30) Foreign Application Priority Data

Jun. 15, 2020   (IT) .................... 102020000014239

(51) Int. Cl.
*G01N 23/046*   (2018.01)
*G01N 23/083*   (2018.01)
(Continued)

(52) U.S. Cl.
CPC ......... *G01N 23/046* (2013.01); *B65G 47/244* (2013.01); *G01N 23/083* (2013.01);
(Continued)

(58) Field of Classification Search
None
See application file for complete search history.

(56) References Cited

U.S. PATENT DOCUMENTS 4,803,639 A  *  2/1989  Steele ................... G06T 7/0004
                                                         378/58
4,989,225 A      1/1991  Gupta et al.
(Continued)

FOREIGN PATENT DOCUMENTS

CA        2415409 A1     11/1998
CN     106841245 A   *   6/2017
(Continued)

OTHER PUBLICATIONS

Pack, J., et al., "Investigation of Saddle Trajectories for Cardiac CT Imaging in Cone-Beam Geometry", Physics in Medicine and Biology, vol. 49, 2004, pp. 2317-2336.

*Primary Examiner* — Thomas R Artman
(74) *Attorney, Agent, or Firm* — Pearne & Gordon LLP; Michelle E. Tochtrop

(57) ABSTRACT

CT scanner comprising a scanning conveyor (9) mounted on a supporting structure and configured to move an object (3) for CT examination forward through a scanning area (8), an input conveyor (10) configured to convey the object until the scanning chamber (2), and an output conveyor (11) configured to convey an object (3) out of the scanning chamber (2), wherein the input conveyor (10), the scanning conveyor (9) and the output conveyor (11) are configured to move forward the object (3) placed on a supporting unit (19) mechanically detached therefore, and wherein the scanning conveyor (9) is configured to rotate the supporting unit (19) and the object (3) on themselves as they travel through the scanning area (8). The input conveyor (10) and the output conveyor (11) are fitted with shields configured in such a way as to intercept all x-rays emitted from the scanning area (8) which escape from the scanning chamber (2) towards the conveyors.

20 Claims, 6 Drawing Sheets

(51) Int. Cl.
*G01V 5/00* (2006.01)
*B65G 47/244* (2006.01)

(52) U.S. Cl.
CPC ..... *G01V 5/005* (2013.01); *G01N 2223/1016* (2013.01); *G01N 2223/309* (2013.01); *G01N 2223/3306* (2013.01); *G01N 2223/3307* (2013.01); *G01N 2223/3308* (2013.01); *G01N 2223/419* (2013.01); *G01N 2223/618* (2013.01); *G01N 2223/643* (2013.01); *G01N 2223/652* (2013.01)

(56) References Cited

U.S. PATENT DOCUMENTS

| | | |
|---|---|---|
| 5,012,498 A | 4/1991 | Cuzin et al. |
| 5,023,895 A | 6/1991 | McCROSKEY et al. |
| 5,119,408 A | 6/1992 | Little et al. |
| 5,238,099 A | 8/1993 | Schroeder |
| 5,648,996 A * | 7/1997 | Gupta ............... G21K 5/10 378/146 |
| 6,437,463 B1 | 8/2002 | Hazelton et al. |
| 6,584,170 B2 | 2/2003 | Aust et al. |
| 6,571,937 B1 | 6/2003 | Costanzo et al. |
| 7,007,792 B1 | 3/2006 | Burch |
| 7,090,067 B2 | 8/2006 | Schiesser et al. |
| 7,233,840 B2 | 6/2007 | Schiesser et al. |
| 7,499,522 B2 | 3/2009 | Chen et al. |
| 7,896,150 B2 | 3/2011 | Smalley et al. |
| 8,161,854 B2 | 4/2012 | Fourney |
| 8,534,172 B2 | 9/2013 | Fourney |
| 8,678,169 B2 | 3/2014 | Baker et al. |
| 8,811,570 B2 | 8/2014 | Speller et al. |
| 9,025,855 B1 | 5/2015 | Christoph et al. |
| 9,341,546 B2 * | 5/2016 | Stuke ............... G01N 23/04 |
| 9,865,066 B2 | 1/2018 | Bedford et al. |
| 10,803,574 B2 | 10/2020 | Kirschenman |
| 10,823,686 B2 * | 11/2020 | Urano ............... G01N 23/18 |
| 2003/0031293 A1 | 2/2003 | Aust et al. |
| 2004/0104100 A1 | 6/2004 | Schiesser et al. |
| 2004/0109532 A1 | 6/2004 | Ford et al. |
| 2005/0116548 A1 | 6/2005 | Oisugi et al. |
| 2006/0283689 A1 | 12/2006 | Schiesser et al. |
| 2007/0205083 A1 | 9/2007 | Smalley et al. |
| 2008/0075226 A1 | 3/2008 | Chen et al. |
| 2009/0067575 A1 | 3/2009 | Seppi et al. |
| 2012/0045033 A1 * | 2/2012 | Stuke ............... G01M 17/013 378/62 |
| 2012/0160638 A1 | 6/2012 | Baker et al. |
| 2012/0175222 A1 | 7/2012 | Fourney |
| 2012/0224666 A1 | 9/2012 | Speller et al. |
| 2014/0376692 A1 | 12/2014 | Schafer et al. |
| 2015/0325010 A1 | 11/2015 | Bedford et al. |
| 2018/0189944 A1 | 7/2018 | Kirschenman |
| 2018/0202947 A1 * | 7/2018 | Urano ............... G01N 23/18 |
| 2019/0154869 A1 | 5/2019 | Gordon et al. |
| 2020/0303997 A1 | 9/2020 | Brinkmann et al. |
| 2020/0408705 A1 | 12/2020 | Kirschenman |
| 2021/0116395 A1 | 4/2021 | Ursella et al. |
| 2021/0389260 A1 * | 12/2021 | Prenn ............... G01N 23/046 |

FOREIGN PATENT DOCUMENTS

| | | |
|---|---|---|
| CN | 210142088 | 3/2020 |
| DE | 102015101378 A1 | 7/2015 |
| DE | 102016107272 A1 | 10/2017 |
| EP | 0326471 A1 | 8/1989 |
| EP | 1205410 | 5/2002 |
| EP | 1283417 A2 | 2/2003 |
| EP | 1398282 A2 | 3/2004 |
| EP | 3106863 A1 | 12/2016 |
| EP | 3351975 A1 | 7/2018 |
| GB | 1156756 A | 7/1969 |
| IT | 102019000019454 | 10/2019 |
| JP | H06133959 A | 5/1994 |
| WO | 9904481 A1 | 1/1999 |
| WO | 9948192 A1 | 9/1999 |
| WO | 200439706 A1 | 5/2004 |
| WO | 200696292 A1 | 9/2006 |
| WO | 200707963 A1 | 1/2007 |
| WO | 200784606 A2 | 7/2007 |
| WO | 2007128216 A1 | 11/2007 |
| WO | 2009130645 A2 | 10/2009 |
| WO | 201094774 | 8/2010 |
| WO | 201111196 | 1/2011 |
| WO | 201137783 A1 | 3/2011 |
| WO | 201142750 A1 | 4/2011 |
| WO | 201412861 A1 | 1/2014 |
| WO | 2017003665 A1 | 1/2017 |
| WO | 2019129561 A1 | 7/2019 |

* cited by examiner

CT SCANNER AND METHOD FOR PERFORMING A CT EXAMINATION OF AN OBJECT

The present invention relates to a CT scanner and a method for performing a CT examination of an object. In particular, the present invention relates to a CT scanner that is intended for use in the industrial sector, particularly in the context of plants in continuous operation.

By way of example, the present invention may be used to perform tomography examinations of food products (fruit, bread, foodstuffs packaged in jars and cans) to verify their internal quality or to check for the absence of unwanted contaminants (such as pieces of plastic or glass), or to examine 3D-printed products (for instance, to check their internal composition, which would otherwise be inaccessible), etc.

It further bears noting that, in the context of the present description, a tomography examination means the reconstruction of a three-dimensional model formed by a plurality of voxels and relating to the density of the object. In particular, each voxel may be associated both with values relating to the absolute density of the object in that area and with values relating to the density variation in that area (such as values showing the density gradient). In the context of the present description and the accompanying claims, the definition of a three-dimensional model obtained by a tomography examination also includes models that have approximations of a greater or smaller degree relative to the actual values; what matters is that the model is appropriate for the type of information to be obtained (for instance, even a very approximate assessment of local density variation may be sufficient for detecting the presence or absence of solid foreign objects in a carton of yoghurt).

Currently, tomography systems are mainly divided into rotor-based systems, which are generally used both in medicine and in industry (for instance, in the timber processing sector), and rotating object-based systems, which are generally used in laboratories.

In the former, the rotor is a mechanical structure on which both the x-ray source and the detector are mounted, with the unit moving altogether around the object to be scanned, which in turn remains motionless or moves along one axis.

In the latter, both the x-ray source and the detector remain motionless, whereas the object must be moved in a precisely controlled manner inside the irradiated area.

Rotor-based systems are costly due to the need to rotate sophisticated equipment; moreover, the rotor tends to be a large structure that cannot easily be installed around the passageway area of the objects for scanning, which advanced continuously along a path.

Known rotating object-based systems, on the other hand, require the object for scanning to be locked in to a system that rotates (and potentially moves) the object in a precise and predetermined manner. Alternatively, therefore, the support for the object can be mechanically connected to the supporting structure either with a single degree of freedom (rotation) or with two degrees of freedom (so as to be able to simultaneously rotate and advance in a controlled manner along a straight path).

One of the main problems of known CT scanners that are connected to continuous-type systems (in which the CT scanner cannot be completely closed during use) is the risk that x-rays might escape from the openings necessary for the input and output of the objects to be examined. The risk particularly concerns x-radiation that can be generated by the physical phenomenon of scattering. This is a phenomenon whereby each material that is struck by x-rays absorbs part of the incident radiation while, at the same time, emitting additional radiation in all directions; this first happens when the incident radiation strikes the examined object. The same phenomenon is repeated when the radiation generated by scattering strikes, in turn, another material.

If the examined object is an object with a relatively high density, then it requires high-power x-rays to be emitted by the CT scanner; consequently, the x-rays generated by scattering are also high-power.

In the case of a continuous-type CT scanner, such as that described in the present invention, the scattering phenomenon is particularly relevant in that the scanning chamber is a chamber with an entry opening and an exit opening, to which conveyors which are, in turn, open at the other end are connected.

Although the conveyors are, in turn, surrounded by an x-ray shield, if they extend in a straight line then there is a real risk that any x-radiation could escape from the CT scanner undisturbed.

The same type of problem is also present in the case of equipment used to perform simple radiographic examinations of objects, such as those used for airport security checks.

To try to overcome this drawback in certain types of equipment used to perform radiographic examinations of objects, solutions have been developed over the years in which the conveyor for the objects extends in a non-straight line, such as by misaligning the entry and exit areas of the conveyor relative to the scanning area.

Although this manufacturing solution enables the risk of unwanted X-ray emission to be limited, the use of non-straight entry and exit paths has so far been possible only for a limited number of objects, which is to say only for those objects that do not run the risk of being damaged by slamming against the lateral walls of the conveyors at the non-straight sections where the objects regularly collide with the lateral walls of the conveyors. On the other hand, this manufacturing solution cannot be used with products that are somewhat delicate, such as packaged bread.

Several examples both of CT scanners and non-straight conveyors for conveying objects, especially for radiographic examination equipment apparatuses, are described in the following documents: GB1156756, EP0326471, U.S. Pat. Nos. 4,989,225, 5,023,895, 5,119,408, 5,238,099, JP06133959, CA2415409, WO9904481, WO9948192, U.S. Pat. No. 6,437,463, EP1205410, EP1283417, EP1398282, WO200439706, US20050116548, WO200696292, WO200707963, WO200784606, WO2007128216, WO2009130645, WO201094774, WO201111196, WO201137783, WO201142750, WO201412861, US20140376692, DE102015101378, EP3351975, EP3106863, DE102016107272 e WO2019129561.

In this context, the technical purpose of the present invention is to implement a CT scanner which offers a solution to the issues mentioned above.

In particular, the technical purpose of the present invention is to implement a CT scanner which at the same time guarantees a reduced risk of undesired x-ray emissions, which makes it possible to perform CT scans of objects of any kind, and which guarantees a relatively high productivity and a high versatility of use.

The technical purpose and the aims indicated above are substantially achieved by a CT scanner and a method for performing a CT scan of an object in accordance with the contents of the accompanying claims.

Further features and the advantages of the present invention will become more apparent upon careful reading of the detailed description of several preferred, non-limiting embodiments of a CT scanner, as shown in the accompanying drawings, in which.

Figure 11:
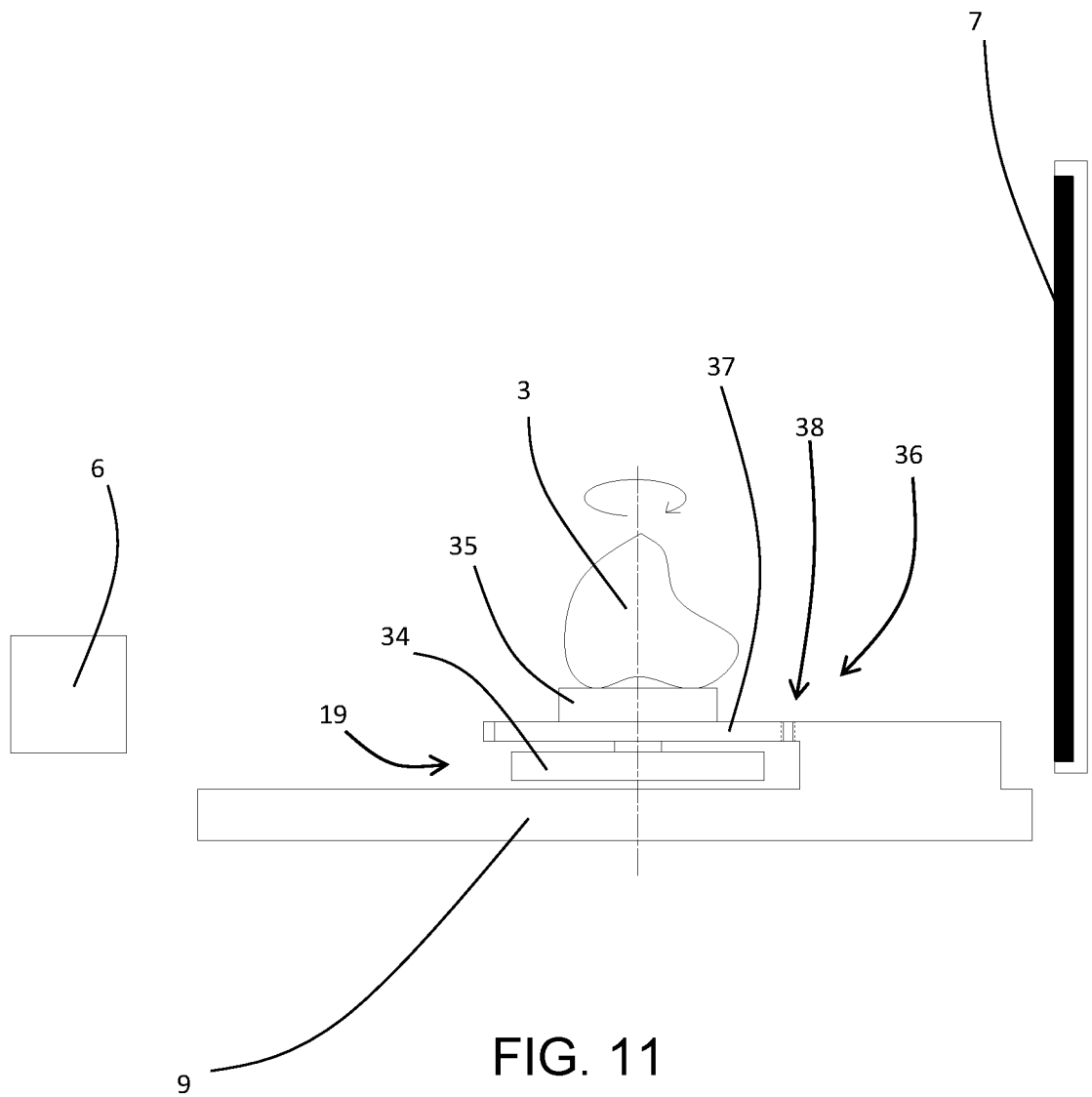
FIG. 11 shows a schematic front view of a further embodiment of a scanning conveyor usable in the context of the present invention.
Figure 13:
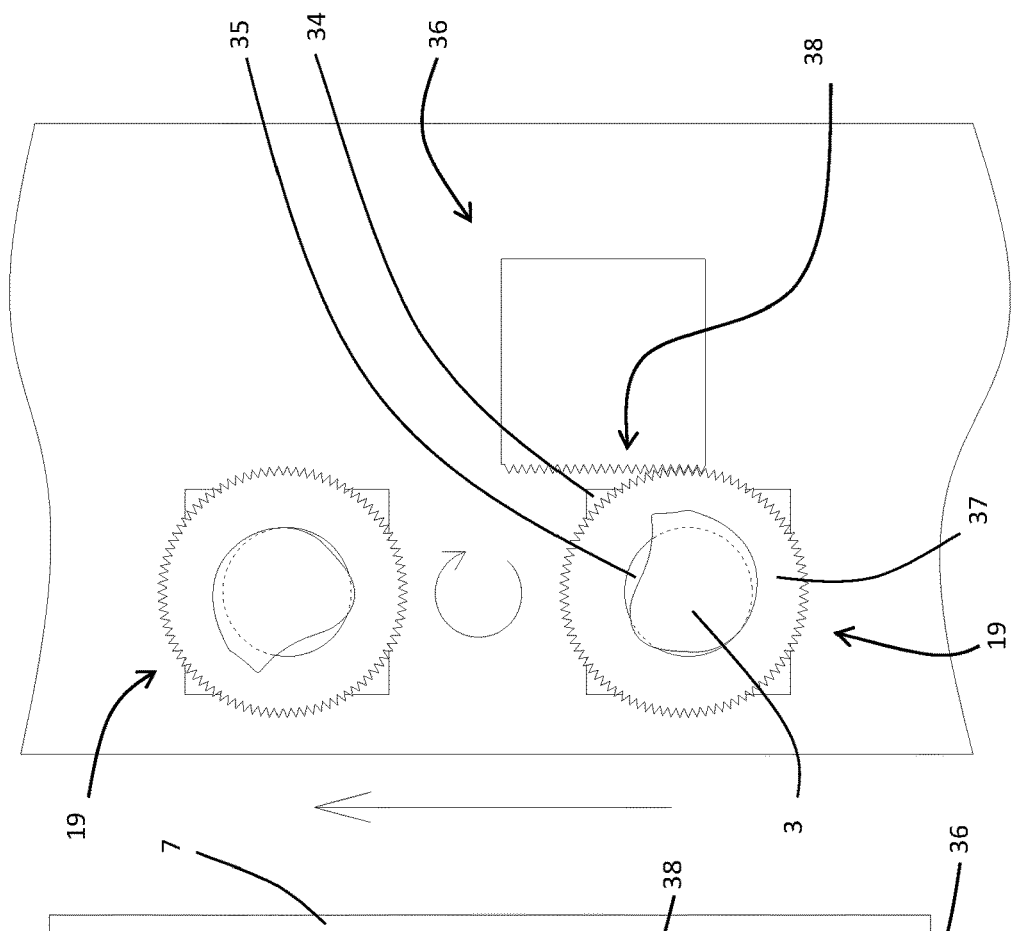
Figure 12:
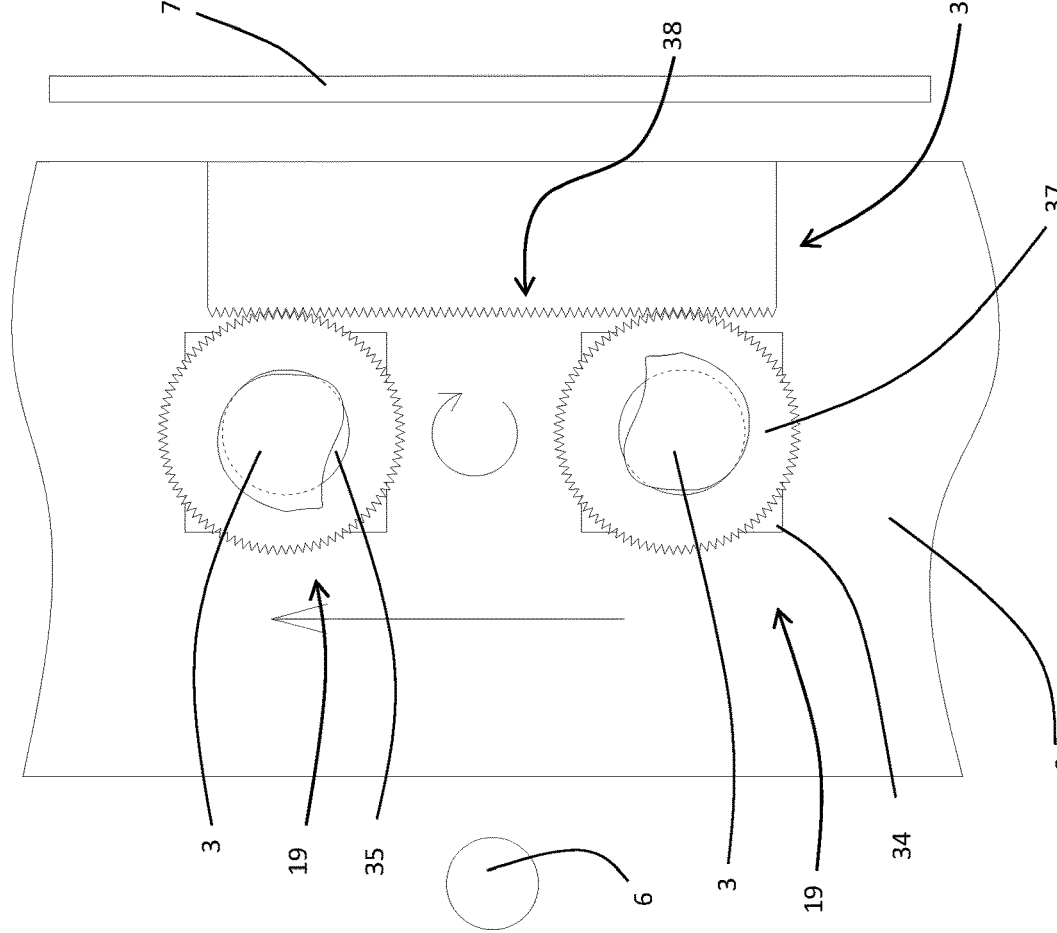

FIG. 12 schematically shows a plan view of the conveyor in FIG. 11;

FIG. 13 shows a plan view of a further embodiment of a scanning conveyor usable in the context of the present invention.

Referring to the drawings above, a complete CT scanner in accordance with the present invention has been assigned reference number 1.

As with known CT scanners, the one described in the present invention comprises a supporting structure (which can be either a single body or a plurality of different parts) on which a scanning chamber 2 is mounted wherein, in use, radiographic images of the object 3 are captured, usable in the known way for tomographic reconstruction.

The scanning chamber 2 is equipped with an entry opening 4 through which, in use, the objects 3 enter and an exit opening 5 through which, in use, the objects 3 exit the scanning chamber 2 itself.

In some embodiments, the entry opening 4 and the exit opening 5 may also coincide.

In some embodiments, the CT scanner is of the tunnel-type.

At least one x-ray emitter 6 and one x-ray detector 7 (more than one can be present) are mounted inside the scanning chamber 2, which are stationary relative to the supporting structure. The x-ray emitter 6 and the x-ray detector 7 are facing each other and spaced apart to delimit a scanning area 8 between them. Furthermore, the x-ray emitter 6 is configured to emit x-rays towards the x-ray detector 7 through the scanning area 8. In turn, in the known way, the x-ray detector 7 is a two-dimensional sensor configured to capture data relating to the x-rays that have passed through the object 3, the data generally consisting of the residual intensity of the x-rays reaching each cell of the sensor. These data are normally stored as two-dimensional maps that can be presented as images (in practice, they are computed radiographs).

According to the present invention, a scanning conveyor 9 is mounted on the supporting structure and is configured to move an object 3 for CT examination forward from the entry opening 4 to the exit opening 5, thus moving it through the scanning area 8.

To feed and remove the objects 3 to/from the scanning chamber 2, the CT scanner 1 further comprises an input conveyor 10 and an output conveyor 11. The input conveyor 10 is mounted on the supporting structure and is configured to convey the object 3 from an input area 12 of the CT scanner 1 to the entry opening 4 of the scanning chamber 2, thus leading the object 3 along an input path 13. The output conveyor 11, on the other hand, is configured to convey the object 3 from an exit opening 5 of the scanning chamber 2 to an output area 14 of the CT scanner 1, thus leading it along an output path 15. Depending on the embodiments, the input conveyor 10, the scanning conveyor 9 and the output conveyor 11 can be different devices, or can be composed of successive sections of a single device, as exemplified in FIG. 1. Moreover, in some embodiments, the input conveyor 10 and the output conveyor 11 may be constituted, in whole or in part, by a single device. In some embodiments, the input area 12 and the output area 14 may coincide.

In order to minimise the risk of the undesired escape x-rays from the scanning chamber 2 into the environment surrounding the CT scanner, the latter comprises at least a first shield 16, a second shield 17 and a third shield 18. The first shield 16, the second shield 17 and the third shield 18 are configured to shield the x-rays, and, in the known way, each of them can advantageously consist of a plurality of suitably connected shields. Depending on the embodiments, the first shield 16, the second shield 17 and the third shield 18 can be separate or can be wholly or partially compenetrated (as exemplified in FIG. 1).

The first shield 16 at least partly surrounds the input conveyor 10; the second shield 17 at least partly surrounds the output conveyor 11; the third shield 18 surrounds the scanning chamber 2. If the input conveyor 10 and the output conveyor 11 are constituted, in whole or in part, by a single device, the first shield 16 and the second shield 17 coincide in whole or in part.

According to a further aspect of the present invention, the input conveyor 10, the scanning conveyor 9 and the output conveyor 11 are advantageously configured to move forward the object 3 placed on the supporting unit 19, which is mechanically detached therefrom (which is to say, it can be freely placed on and removed from the conveyors). At least in some embodiments, the CT scanner 1 comprises a plurality of supporting units 19 (even if these can also be supplied separately from the CT scanner 1).

In the preferred embodiments, in particular, the supporting unit 19 can be advantageously shaped like a tray or a sled, and defines an upper resting surface 20 which in turn constitutes a surface for the object 3 to lie upon.

Figure 3:
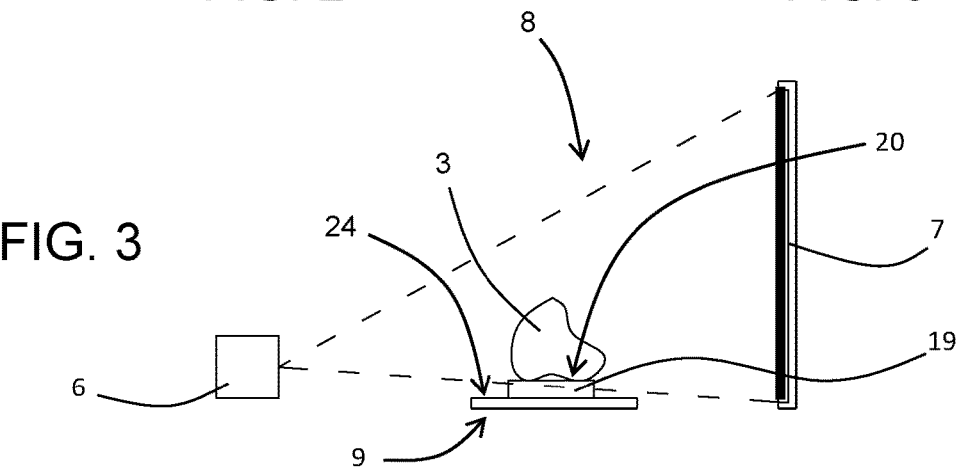
FIG. 3 shows a schematic front view of a scanning area of a CT scanner according to a first embodiment of the present invention.
Figure 4:
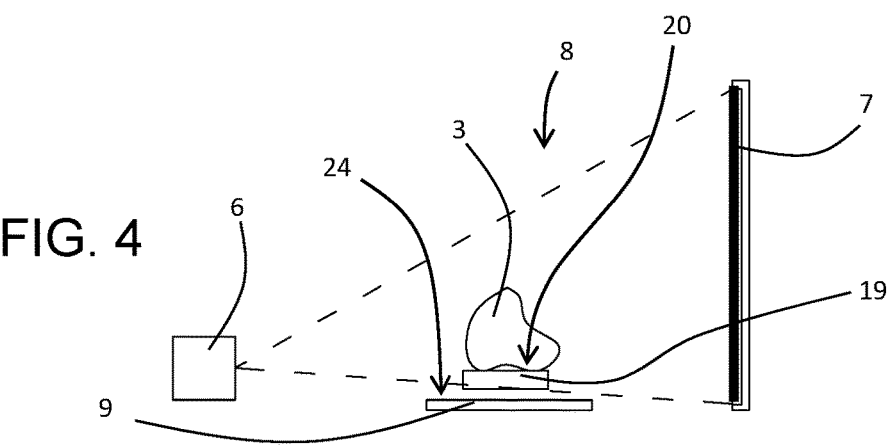
FIG. 4 shows a schematic front view of a scanning area of a CT scanner according to a second embodiment of the present invention.

As better described below, in the two preferred embodiments identified by the applicant so far, the supporting unit 19 rests on the input conveyor 10, the scanning conveyor 9 and the output conveyor 11, either by simply resting thereupon (FIG. 3) or by magnetic levitation (FIGS. 4 and 5—the particularly preferred construction solution at the moment, guaranteeing the best possibilities of controlling the movement of the supporting unit 19).

Figure 2:
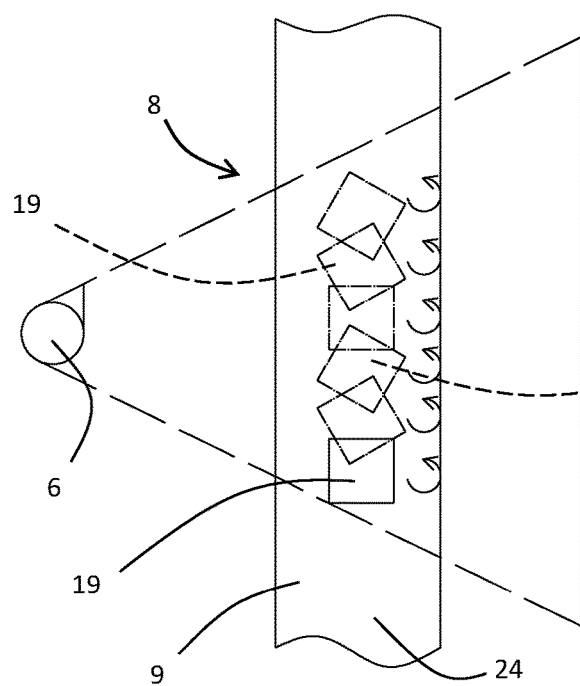
FIG. 2 shows a schematic plan view of a scanning area of a CT scanner according to a first embodiment of the present invention.

The scanning conveyor 9 is further configured to move the object 3 placed on the supporting unit 19 forward through the scanning area 8 while simultaneously rotating at least part of the supporting unit 19 and the object 3 on themselves, in such a way as to gradually point the object 3 in a plurality of different angular positions relative to the x-ray emitter 6 and detector 7 (FIG. 2). Advantageously, the scanning conveyor 9 is configured to move along and rotate at least part of the supporting unit 19 and the object 3 on themselves, rotating them also relative to the scanning conveyor 9. In some embodiments, the scanning conveyor 9 is configured to move the object 3 placed on the supporting unit 19 forward through the scanning area 8 while simultaneously rotating the entire supporting unit 19 and the object 3 on themselves. In other embodiments, on the other hand, the scanning conveyor 9 is configured to, at the same time, rotate on themselves only the object 3 and part of the supporting unit 19 on which the object 3 rests. Below, when making reference to the rotation of the object 3 and of the supporting unit 19 on themselves, reference will be made both to the case of rotating the entire supporting unit 19 and to the case of rotating only the part of the supporting unit on which the object rests, unless the context indicates otherwise.

As the object 3 moves forward through the scanning area 8 and the object 3 rotates on itself, the x-ray detector 7 can therefore capture—a plurality of times—data relating to the X-rays that have passed through the object 3; on each capture, the object 3 therefore has a different orientation relative to the x-rays passing through it, as occurs in any CT scanner.

According to a further aspect of the present invention, the input conveyor 10 and the first shield 16 are configured so that the first shield 16 intercepts any x-rays emitted (which is to say, directly emitted rays, without considering their subsequent diffusion with changes in their line of propagation) from the scanning area 8 which exit the scanning chamber 2 through the entry opening 4. In particular, the input conveyor 10 and the first shield 16 are configured so that these x-rays cannot freely reach the input area 12. It should be noted that, in the context of the present description and of the accompanying claims, by indicating that a shield intercepts specific x-rays, the intention is to give a solely geometric indication in that these x-rays are propagated in straight lines that must cross the shield, and not an indication that the shield actually absorbs the x-rays.

In turn, the output conveyor 11 and the second shield 17 are configured so that the second shield 17 intercepts any x-rays emitted (directly) from the scanning area 8 which exit the scanning chamber 2 through the exit opening 5. In particular, these are configured so that these x-rays cannot freely reach the output area 14.

Although the preferred embodiments do not always envisage the total interception both of the x-rays leaving the entry opening 4 and of those leaving the exit opening 5, if the CT scanner 1 is positioned somewhere where any escape of radiation from one of the two openings would not be problematic for the safety of the operators, then it is also possible for one of the two conveyor-shielding pairs to not be configured according to the above (this may apply, for instance, if the conveyor and the relative shield are positioned inside a structure which, itself, acts as an additional shield).

Figure 1:
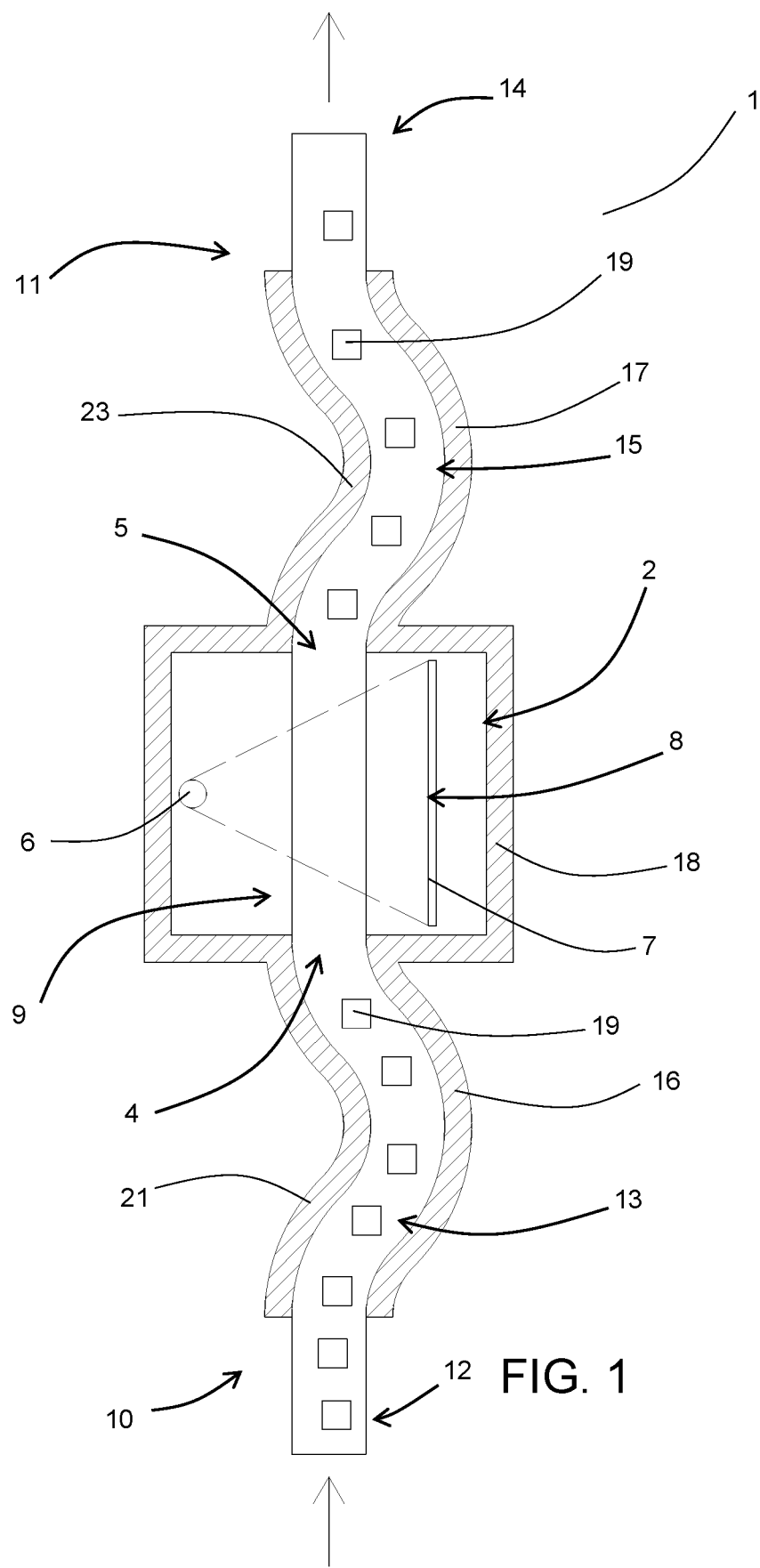
FIG. 1 shows a schematic, partially cross-sectioned plan view of a CT scanner made according to the present invention.

According to the preferred embodiments, the input conveyor 10 and the output conveyor 11 define an input path 13, and an output path 15 respectively, both flat and tortuous, which is to say any non-straight line such as that shown in FIG. 1, or a path in a U-shape, S-shape, L-shape, N-shape, etc.

In many installations of the CT scanner 1, in the context of continuous systems, the input area 12, the scanning area 8 and the output area 14 may have to be aligned in a straight line (as exemplified in FIG. 1). In this event, the first shield 16 preferably comprises a first intercepting portion 21, and the input conveyor 10 (which is to say, the input path 13) and the first shield 16 are configured so that the first intercepting portion 21 is interposed between the input area 12 and the entry opening 4, so that the first intercepting portion 21 is able to intercept any x-rays emitted by the scanning area 8 (typically due to the phenomenon of diffraction—scattering—primary) which exit the scanning chamber 2 through the entry opening 4 and which are directed towards the input area 12. Likewise, the second shield 17 preferably comprises a second intercepting portion 23, and the output conveyor 11 (which is to say, the output path 15) and the second shield 17 are configured so that the second intercepting portion 23 is interposed between the output area 5 and the exit opening 14, so that the second intercepting portion 17 is able to intercept any x-rays emitted by the scanning area 8 which exit the scanning chamber 2 through the exit opening 5 and which are directed towards the output area 14. To achieve this outcome, the input path 13 and the output path 15 can be extended at least partly around the first intercepting portion 21 of the first shield 16, and at least partly around the second intercepting portion 23 of the second shield 17, respectively.

In the embodiment shown in FIG. 1, the first intercepting portion 21 and the second intercepting portion 23 simply consist of a section of the respective shield which flanks the relative path and which has a convex pattern if viewed from the inside of the respective conveyor (which is to say, so as to completely obstruct the line of sight between the entry/exit opening 4 and the input/output area 12/14, respectively).

In the preferred embodiment, then, the scanning conveyor 9 is configured to rotate the supporting unit 19 and the object 3 resting thereupon, on themselves, about a transverse axis of rotation that is preferably perpendicular to a travelling plane 24 of the supporting unit 19 (the travelling plane 24 being generally horizontal and generally defined by the scanning conveyor 9).

As mentioned above, in a preferred embodiment, at least one of either the input conveyor 10, the output conveyor 11 and/or the scanning conveyor 9 (but preferably all) consists of a magnetic levitation conveyor, and the supporting unit 19 consists of a carriage that can be driven by magnetic levitation.

In this event, the interaction between the magnetic levitation conveyor and the carriage is intended, on the one hand, to keep the carriage raised relative to the conveyor (FIGS. 4 and 5) and, on the other hand, to move the carriage relative to the conveyor, both in terms of its travel through the scanning area 8 and the rotation of the carriage on itself (as schematically shown in FIG. 2). In other words, the scanning conveyor 9 is a planar-motor conveyor. By way of example, the one currently marketed by the German company Beckhoff under the brand name Xplanar™ can be used.

If using a magnetic levitation conveyor, both the travel of the supporting unit 19 and of the object 3 and their rotation on themselves are advantageously caused solely by the magnetic levitation conveyor, without physical contact, between the magnetic levitation conveyor and the supporting unit 19.

The use of a magnetic levitation conveyor and a special carriage is particularly preferred because, if properly designed, it can enable the movement of the carriage to be controlled with extremely high degrees of precision, which are compatible with performing an accurate tomographic reconstruction.

Figure 5:
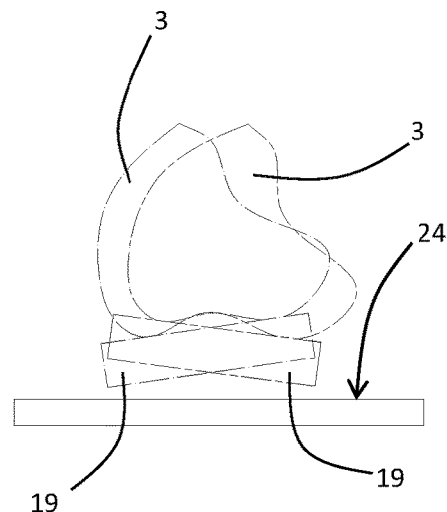
FIG. 5 shows a schematic front view of certain movable movements of a supporting unit in the scanning area of a CT scanner according to a further embodiment of the present invention.

If using a magnetic levitation conveyor, as shown in FIG. 5, then to improve the subsequent tomographic reconstruction the supporting unit 19 can also be moved forward, by means of the scanning conveyor, through the scanning area 8 while modifying the incline of the lying plane for the object 3 relative to the axis of rotation about which the object is rotated (vertical in FIG. 5), so that the rotational motion made by the object 3 in the scanning area 8 does not have a constant axis of rotation.

Indeed, it is known that a cone-beam tomography, in which rotation is made about a single axis, does not allow an exact reconstruction of the entire volume. Instead, an exact reconstruction is possible when "saddle" trajectories, for instance, are used (such as those shown in the article: Pack, Jed D., Frédéric Noo, and H. Kudo. "Investigation of saddle trajectories for cardiac CT imaging in cone-beam geometry." Physics in Medicine & Biology 49.11 (2004): 2317) or, in any case, when the object is rotated on an inconstant axis of rotation in general.

In other embodiments, on the other hand, at least one of either the input conveyor 10, the output conveyor 11 and/or the scanning conveyor 9 can consist of a activated wheel conveyance plane 25 or by a activated roller conveyor belt 26. Of the two, the activated wheel conveyance plane 25 is the preferred solution as far as the scanning conveyor 9 is concerned.

Figure 7:
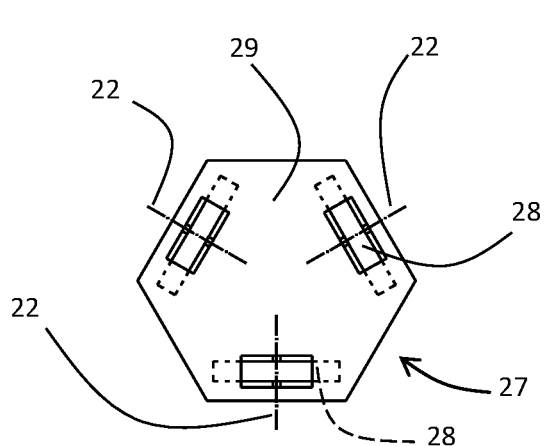
FIG. 7 shows a schematic plan view of a module that can be used in a conveyor of a CT scanner according to a further variant of the present invention.
Figure 8:
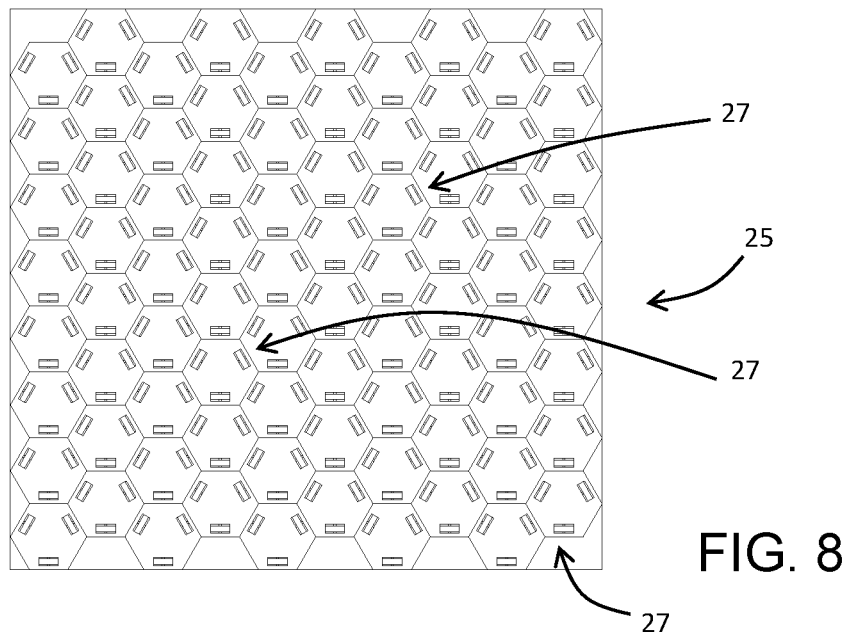
FIG. 8 shows a schematic plan view of a conveyor comprising a plurality of modules of the type shown in FIG. 7.

An example of a activated wheel conveyance plane 25 is shown in FIG. 8 and consists of a plurality of modules 27 with a substantially hexagonal plan (a single module 27 is shown in FIG. 7), each of which has three activated wheels 28 rotatably mounted according to coplanar axes of rotation 22 (parallel to the travelling plane 24) which intersect each other in the centre of the module 27 and which are inclined relative to each other at an angle of 120° (FIG. 7). Each activated wheel 28 can be operated independently of the others and partially protrude from the upper surface 29 of the module to act as a rest for the supporting unit 19. The modules 27 are mounted side by side, as shown in FIG. 8, with coplanar upper surfaces 29 to define the conveyance plane 25. By separately controlling the rotation of each activated wheel 28, each supporting unit 19 resting on the conveyance plane 25 can be made to perform any motion in the travelling plane 24. One device of this type, for instance, is advertised by Bremer Institut für Produktion and Logistik GmbH under the Celluveyor brand.

Figure 10:
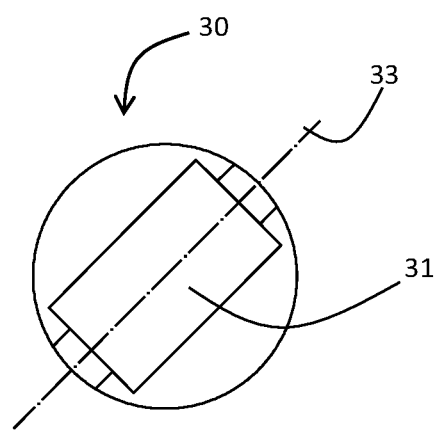
FIG. 10 shows a schematic plan view of a detail of the conveyor in FIG. 9.
Figure 9:
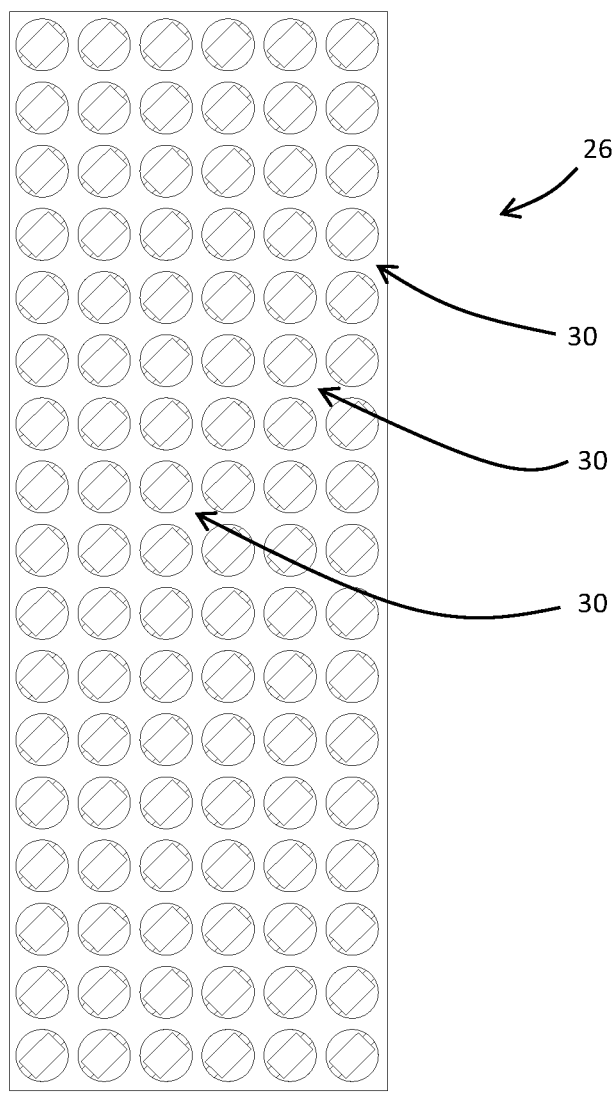
FIG. 9 shows a schematic plan view of a conveyor according to a further embodiment of the present invention.

An example of a activated roller conveyor belt 26, on the other hand, is shown in FIG. 9; this is a belt 26 in which a two-dimensional cell matrix 30 is obtained (as shown, enlarged, in FIG. 10), onto each of which cells a activated roller 31 is mounted, arranged with its axis 33 inclined relative both to the line of travel of the belt 26 and in a line perpendicular thereto. Each activated roller 31 rotates about an axis coplanar with the belt 26 and is sized in such a way as to protrude both above and below the belt 26. By acting on the underside of the belt 26, the rotation of each individual activated roller 31 can thus be controlled so as to move, as desired, the supporting unit 19 resting upon the belt 26. Depending on the embodiments, all activated rollers 31 can have axes of rotation parallel to each other, or groups of activated rollers 31 can have their respective axes of rotation inclined in a different way. Examples of this type of conveyor are those marketed by the US company Intralox, L.L.C. under the Activated Roller Belt™ brand.

Figure 6:
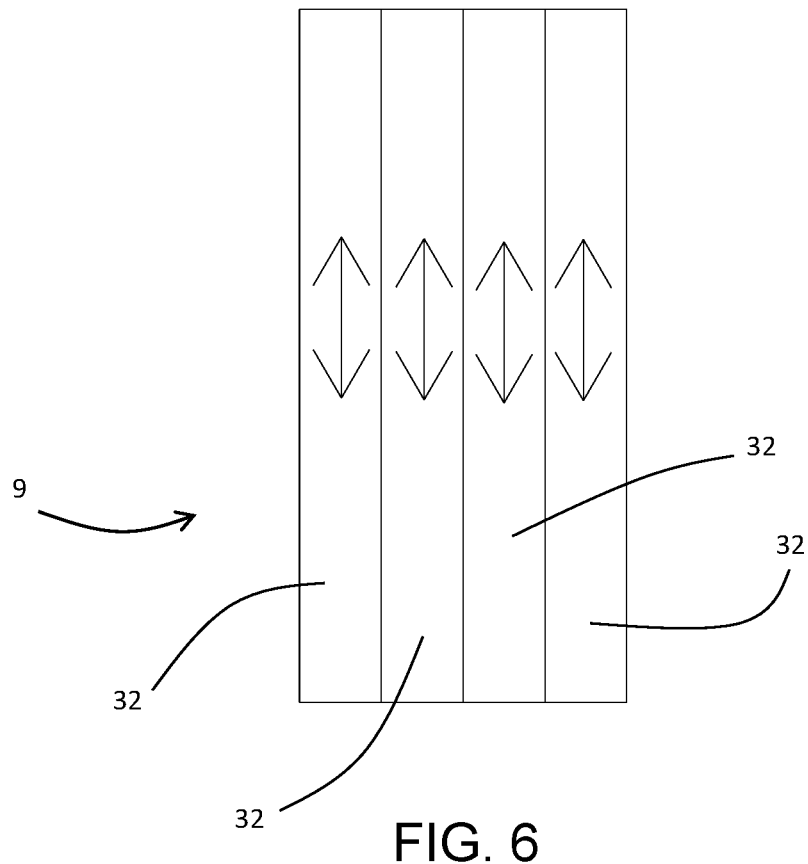
FIG. 6 shows a schematic plan view of a further variant of a scanning conveyor forming part of a CT scanner according to the present invention.

FIG. 6 shows a different embodiment in which the scanning conveyor 9 consists of a plurality of conveyor belts 32 placed side by side, which can be controlled separately both in terms of their line of travel and their travel speed. By suitably combining the line of travel and the travel speed of each conveyor belt 32, both the travel and the rotation on itself of a supporting unit 19 resting on two or more thereof can be controlled as desired.

In some embodiments, as already mentioned, only part of the supporting unit 19 rotates with the object 3 while it is on the scanning conveyor. In these embodiments, advantageously, the supporting unit comprises a lower base 34 and a platform 35 rotatably connected to the lower base 34, placed above it and configured to support the object 3.

In these embodiments, the scanning conveyor 9 comprises an abutment unit 36 configured to interact with the platform 35 of the supporting unit 19. The abutment unit 36 is configured to come into contact with the platform 35 or another element connected to it, and in this way to cause the platform 35 and of the object 3 to rotate relative to the lower base 34.

FIGS. 11 to 13 show two embodiments in which the scanning conveyor 9 is of the magnetic levitation type, but similar solutions can also be adopted with conveyors of the other types described.

In the embodiments in FIGS. 11 to 13, the lower base 34 is a magnetic levitation drive carriage and the upper platform 35 is associated to a toothed wheel 37 which protrudes sufficiently to be able to mesh with a rack 38 which is part of the abutment unit. More generally, the platform 35 may comprise a coupling wheel which, during the rotation of the platform 35, rolls on the abutment unit 36, causing the platform 35 to rotate. In fact, the toothed wheel 37 also rolls on the rack 38 when the two are meshed with each other and the base 34 slides relative to the abutment unit 36 in parallel to the direction of development of the rack 38.

Advantageously, the platform 35 is caused to rotate by the motion of the supporting unit 19 relative to the abutment unit 36.

In some embodiments, the abutment unit 36 is fixed relative to the scanning conveyor 9 (for example, it is integral with it as shown in FIGS. 11 and 12).

In other embodiments, the abutment unit 36 may also be movable relative to the scanning conveyor 9. The movability of the abutment unit can be exploited both to rotate the platform 35 while holding still or slowing down the base 34 (making it pass near the abutment unit at a relatively high speed) and to position the abutment unit 36 in an optimal position relative to the trajectory of the base 34.

In the embodiment in FIG. 13, the movable abutment unit 36 also comprises a magnetic levitation drive carriage.

In order to operate each active part of the CT scanner, an electronic operation and control unit (not shown) is present, which is operationally connected to each active part, such as the emitter 6, the detector 7, the input conveyor 10, the output conveyor 11, the scanning conveyor 9, etc.

In order to allow an adequate tomographic reconstruction of the object 3 under examination based on the data captured by the x-ray detector 7, the position of the object 3 relative to the emitter 6 and/or the detector 7 must be precisely known. Depending on the embodiments, this outcome can be achieved either by precisely checking the position of the object 3 as it crosses the scanning area 8 (for instance, by using an appropriate scanning conveyor 9) or by identifying the position gradually.

In this latter case, the CT scanner 1 further comprises a device for detecting the position of the object 3 (not shown). This device for detecting the position of the object 3 is associated to the scanning area 8 to determine the position of the object 3 relative to the emitter 6 and/or detector 7 when each capture is made by the detector 7.

Various examples of devices for detecting the position of the object 3 are described in patent application no. 102019000019454, in the name of this same applicant, to which reference should be made for more details.

Depending on the embodiments, the device for detecting the position of the object 3 can either be an autonomous device capable of providing information on the position of the object 3 relative to the electronic operation and control unit, or can consist of the electronic operation and control unit itself. Furthermore, the device for detecting the position of the object 3 can act either at the time that each detection is made by the x-ray detector 7, through the substantially real-time processing of data, or at a later stage through the processing of previously acquired data instead.

In the preferred embodiment, the device for detecting the position of the object 3 comprises a camera observing the scanning area 8. The relative positions of the object 3 in the scanning area 8 are then determined by comparison between the images detected by the camera each time the x-ray detector 7 captures a computed radiographic image. This comparison can be made by observing the movement either of characteristic points of the object 3 and/or the supporting unit 19, or by observing the movement of identification elements applied specifically to the object 3 or to the support.

The operation of the various variants of the CT scanner 1 described above corresponds to a specific implementation of a more general method for performing a CT scan of an object 3. All elements described above in relation to the CT scanner 1 must therefore be understood as also referable to the method and vice versa.

Under this method, the object 3 for scanning is placed on a mechanically free supporting unit 19, and the supporting unit 19 and the object 3 are moved forward into a scanning area 8. The step of moving the supporting unit 19 and the object 3 forward into the scanning area 8 is performed by moving the supporting unit 19 forward along a tortuous input path 13 which extends, inside a first shield 16 configured to shield the x-rays, in such a way that all x-rays emitted by the scanning area 8 which enter the input path 13 are intercepted by the first shield 16.

Subsequently, under the method, the supporting unit 19 and the object 3 are moved forward through the scanning area 8, while further being made to rotate on themselves. As the object 3 moves and rotates in the scanning area 8, under the method, a plurality of radiographic images of the object 3 are captured from different relative angles using an x-ray emitter 6 and a fixed x-ray detector 7, which are facing each other and mounted on two opposite sides of the scanning area 8.

Once the radiographic images are captured, under the method, these are combined so as to compute the tomographic reconstruction of the object 3. Additionally, once the object 3 leaves the scanning area 8, under the method, the supporting unit 19 and the object 3 are removed from the scanning area 8. Advantageously, the removal step is performed by moving the supporting unit 19 forward along a tortuous output path 15 which extends, inside a second shield 17 configured to shield the x-rays, in such a way that all x-rays emitted by the scanning area 8 which enter the output path 15 are intercepted by the second shield 17.

The present invention offers significant advantages.

Indeed, the present invention makes it possible to implement a CT scanner 1 which at the same time guarantees a reduced risk of undesired x-ray emissions, makes it possible to perform CT scans of objects 3 of any kind and guarantees a relatively high productivity and a high versatility of use.

Finally, it is worth noting that the present invention is relatively easy to make and that the cost associated with its implementation is also not very high.

Many modifications and variations can be made to the invention as designed herein without departing from the scope of the present invention.

All details can be replaced by other technically equivalent details and any materials, shapes and dimensions of the various components may be used according to requirements.

The invention claimed is:

1. CT scanner comprising:
a supporting structure;
a scanning chamber (2) mounted on the support structure and equipped with an entry opening (4) and an exit opening (5);
an x-ray emitter (6) and an x-ray detector (7), which are stationary relative to the supporting structure, are facing each other and are mounted apart from each other in the scanning chamber (2), the x-ray emitter (6) being configured to emit x-rays towards the x-ray detector (7) through a scanning area (8);
a scanning conveyor (9) mounted on the supporting structure and configured to move an object (3) for CT examination forward from the entry opening (4) to the exit opening (5), through the scanning area (8);
an input conveyor (10) mounted on the supporting structure and configured to convey the object (3) from an input area (12) of the CT scanner (1) to the entry opening (4) of the scanning chamber (2) along an input path (13);
an output conveyor (11) mounted on the supporting structure and configured to convey the object (3) from the exit opening (5) of the scanning chamber (2) to an output area (14) of the CT scanner (1) along an output path (15);
a first shield (16) configured to shield the x-rays and at least partly surrounding the input conveyor (10);
a second shield (17) configured to shield the x-rays and at least partly surrounding the output conveyor (11);
a third shield (18) configured to shield the x-rays and surrounding the scanning chamber (2);
wherein the input conveyor (10) and the output conveyor (11) are configured to move forward the object (3) placed on a supporting unit (19) that is mechanically detached therefrom;
wherein the scanning conveyor (9) is configured to move the object (3) placed on the supporting unit (19) forward through the scanning area (8) while simultaneously rotating at least part of the supporting unit (19) and the object (3) on themselves;
wherein the scanning conveyor (9) is selected from among an activated wheel (28) conveyance plane (25), an activated roller conveyor belt (26), a planar-motor conveyor, a magnetic levitation conveyor and a conveyor consisting of a plurality of conveyor belts (32) placed side by side, which can be controlled separately both in terms of their line of travel and their travel speed, and wherein, when the scanning conveyor (9) is a magnetic levitation conveyor, the supporting unit (19) is a magnetically levitating carriage.

2. CT scanner according to claim 1, wherein:
the input conveyor (10) and the first shield (16) are configured so that the first shield (16) intercepts all x-rays emitted from the scanning area (8) which leave the scanning chamber (2) through the entry opening (4); and/or
the output conveyor (11) and the second shield (17) are configured so that the second shield (17) intercepts all x-rays emitted from the scanning area (8) which leave the scanning chamber (2) through the exit opening (5).

3. CT scanner according to claim 2, wherein the input conveyor (10) defines a tortuous input path (13) and wherein the input path (13) extends at least partly around the first intercepting portion (21) of the first shield (16).

4. CT scanner according to claim 1, wherein the input conveyor (10) defines a tortuous input path (13).

5. CT scanner according to claim 1, wherein the output conveyor (11) defines a tortuous output path (15).

6. CT scanner according to claim 5, wherein the output path (15) extends at least partly around the second intercepting portion (23) of the second shield (17).

7. CT scanner according to claim 1, wherein the scanning conveyor (9) is configured to rotate at least part of the supporting unit (19) and the object (3) on themselves about an axis of rotation transverse to a travelling plane (24) on which the supporting unit (19) travels.

8. CT scanner according to claim 1, wherein the input conveyor (10) and/or the output conveyor (11) are magnetic levitation conveyors and wherein the supporting unit (19) is a magnetically levitating carriage.

9. CT scanner according to claim 1, wherein the input conveyor (10) and/or the output conveyor (11) consist of a activated wheel (28) conveyance plane (25) or an activated roller conveyor belt (26).

10. CT scanner according to claim 1, wherein the scanning conveyor (9) is a magnetic levitation conveyor and wherein the rotation of the supporting unit (19) and of the object (3) on themselves is caused solely by the magnetic levitation conveyor, without physical contact, between the magnetic levitation conveyor and the supporting unit (19).

11. CT scanner according to claim 1, wherein the supporting unit (19) comprises a lower base (34) and an upper platform (35) that is rotatably connected to the lower base (34) and is configured to support the object (3), and wherein the scanning conveyor (9) comprises an abutment unit (36) configured to interact with the platform (35) of the supporting unit (19) in order to cause the platform (35) and the object (3) to rotate relative to the lower base (34).

12. CT scanner according to claim 11, wherein the platform (35) comprises a coupling wheel which, during the rotation of the platform (35), rolls on the abutment unit (36), causing the platform (35) to rotate.

13. CT scanner according to claim 11, wherein the abutment unit (36) is fixed relative to the scanning conveyor (9) or is moveable relative to the scanning conveyor (9), and wherein the platform (35) is caused to rotate by the motion of the supporting unit (19) relative to the abutment unit (36).

14. CT scanner according to claim 1, wherein the scanning conveyor (9) is a magnetic levitation conveyor and wherein the scanning conveyor (9) is programmed to move the supporting unit (19) forward through the scanning area (8), modifying its incline relative to the axis of rotation about which it is rotated so that the rotational motion performed by the object (3) in the scanning area (8) has an inconstant axis of rotation.

15. CT scanner according to claim 1, further comprising an electronic operation and control unit.

16. CT scanner according to claim 1, further comprising a device for detecting the position of the object (3) which is associated to the scanning area (8) to determine the position of the object (3) relative to the emitter (6) and/or detector (7) at the time of each capture by the detector (7).

17. CT scanner according to claim 1, wherein, as the object (3) moves forward through the scanning area (8) and as the object (3) rotates on itself, the detector (7) captures—a plurality of times—data relating to the x-rays that have passed through the object (3).

18. CT scanner according to claim 1, wherein the scanning conveyor (9) is configured to rotate at least part of the supporting unit (19) and the object (3) on themselves, rotating them relative to the scanning conveyor (9).

19. CT scanner according to claim 1, wherein entry opening (4) and the exit opening (5) coincide, and/or wherein the input area (12) and the output area (14) coincide, and/or wherein the input conveyor (10) and the output conveyor (11) are constituted, in whole or in part, by the same device and the first shield (16) and the second shield (17) coincide in whole or in part.

20. Method for performing a CT examination of an object (3), comprising the following steps:
place the object (3) on a mechanically-free supporting unit (19);
feed the supporting unit (19) with the object (3) into a scanning area (8);
move the supporting unit (19) with the object (3) forward through the scanning area (8), further making at least part of the supporting unit (19) and the object (3) rotate on themselves;
as the object (3) moves and rotates in the scanning area (8), capture a plurality of radiographic images of the object (3) from different relative angles, using a fixed x-ray emitter (6) and x-ray detector (7) which are facing each other and mounted on two opposite sides of the scanning area (8);
combine the radiographic images thus obtained to compute a tomographic reconstruction of the object (3); and
remove the supporting unit (19) with the object (3) from the scanning area (8);
wherein:
the step of feeding the supporting unit (19) with the object (3) into the scanning area (8) is performed by moving the supporting unit (19) forward along a tortuous input path (13) which extends, inside a first shield (16) configured to shield x-rays, in such a way that all x-rays emitted by the scanning area (8) which enter the input path (13) are intercepted by the first shield (16);
the step of removing the supporting unit (19) with the object (3) from the scanning area (8) is performed by moving the supporting unit (19) forward along a tortuous output path (15) which extends, inside a second shield (17) configured to shield x-rays, in such a way that all x-rays emitted by the scanning area (8) which enter the output path (15) are intercepted by the second shield (17);
wherein the step of moving the supporting unit (19) with the object (3) forward through the scanning area (8) is further performed by using a scanning conveyor (9) selected from among an activated wheel (28) conveyance plane (25), an activated roller conveyor belt (26), a planar-motor conveyor, a magnetic levitation conveyor and a conveyor consisting of a plurality of conveyor belts (32) placed side by side, which can be controlled separately both in terms of their line of travel and their travel speed, when the scanning conveyor (9)

is a magnetic levitation conveyor, the supporting unit (19) being a magnetically levitating carriage.

\* \* \* \* \*